(12) United States Patent
Moreau et al.

(10) Patent No.: US 7,831,723 B2
(45) Date of Patent: Nov. 9, 2010

(54) ELECTRONIC DOCUMENT FOR DESCRIBING A COMPUTER SERVICE

(75) Inventors: Jean-Jacques Moreau, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 1531 days.

(21) Appl. No.: 10/654,023

(22) Filed: Sep. 4, 2003

(65) Prior Publication Data
US 2004/0117733 A1 Jun. 17, 2004

(30) Foreign Application Priority Data
Sep. 5, 2002 (FR) .................................. 02 10993

(51) Int. Cl.
*G06F 15/16* (2006.01)
(52) U.S. Cl. ........................................ 709/230; 715/13
(58) Field of Classification Search ................... 715/13; 709/230
See application file for complete search history.

(56) References Cited

U.S. PATENT DOCUMENTS

| | | | |
|---|---|---|---|
| 6,418,441 B1 * | 7/2002 | Call | 707/10 |
| 6,732,175 B1 * | 5/2004 | Abjanic | 709/227 |
| 6,934,756 B2 * | 8/2005 | Maes | 709/227 |
| 6,941,520 B1 * | 9/2005 | Lewallen | 715/762 |
| 7,165,113 B2 * | 1/2007 | Karp et al. | 709/230 |
| 2002/0072922 A1 * | 6/2002 | Suzuki et al. | 705/1 |
| 2002/0072968 A1 * | 6/2002 | Gorelick et al. | 705/14 |
| 2002/0107999 A1 * | 8/2002 | Zimmermann et al. | 709/330 |
| 2002/0143644 A1 * | 10/2002 | Tosun et al. | 705/26 |
| 2003/0028559 A1 | 2/2003 | Moreau | 707/501.1 |
| 2003/0084177 A1 * | 5/2003 | Mulligan | 709/230 |
| 2003/0106025 A1 * | 6/2003 | Cho et al. | 715/523 |
| 2003/0137539 A1 * | 7/2003 | Dees | 345/762 |
| 2003/0204612 A1 * | 10/2003 | Warren | 709/230 |

(Continued)

FOREIGN PATENT DOCUMENTS

EP  1 143 356  10/2001

(Continued)

OTHER PUBLICATIONS

Simple Object Access Protocol (SOAP) 1.1 W3C Note May 8, 2000; http://www.w3.org/TR/2000/NOTE-SOAP-20000508 Authors: Don Box, (developerMentor); David Ehnebuske (IBM); Gopal Kakivaya, Andrew Layman, Satish Thatte, Henrik Frystyk Nielsen (Microsoft); Noah Mendelsohn (Lotus Development Corp); Dave Winer (UserLand Software, Inc).*

(Continued)

*Primary Examiner*—Thu Nguyen
*Assistant Examiner*—Tauqir Hussain
(74) *Attorney, Agent, or Firm*—Fitzpatrick Cella, Harper & Scinto (57) ABSTRACT

An electronic document for describing a service proposed by a server computer of a communication network, comprises a first part adapted to describe messages exchanged between computers of the communication network and a second part adapted to comprise information relating to the transmission of messages over the communication network.

The second part comprises two sub-parts, a first sub-part being adapted to comprise information on a format for representing messages and a second sub-part being adapted to comprise information on a communication protocol implemented for the transmission of the messages over the communication network.

22 Claims, 6 Drawing Sheets

U.S. PATENT DOCUMENTS

2005/0091078 A1* 4/2005 Hunt et al. .................... 705/1
2005/0097147 A1* 5/2005 Hunt et al. .................. 707/200
2006/0011720 A1* 1/2006 Call .......................... 235/383

FOREIGN PATENT DOCUMENTS

EP        1 229 442        8/2002
EP        1229442 A2 *      8/2002

OTHER PUBLICATIONS

SOAP Messages with Attachments W3C Note Dec. 11, 2000; http://www.w3.org/TR/2000/NOTE-SOAP-attachments-20001211; Authors: John J. Barton ( Hewlett Packard Labs); Satish Thatte ( Microsoft); Henrik Frystyk Nielsen ( Microsoft).*

Web Services Description Language (WSDL) 1.1, W3C Note Mar. 15, 2001, http://www.w3.org/TR/2001/NOTE-wsdl-20010315,Latest version: http://www.w3.org/TR/wsdl; Authors (alphabetically): Erik Christensen, Microsoft Francisco Curbera, IBM Research Greg Meredith, Microsoft Sanjiva Weerawarana, IBM Research Copyright© 2001 Ariba, International Business.*

F. Curbera, et al., "Unraveling the Web Services Web: An Introduction to SOAP, WSDL, and UDDI", IEEE Internet Computing, Mar.-Apr. 2002, IEEE, USA, Vol. 6, No. 2, pp. 86-93.

E. Christensen, et al., "Web Services Description Language (WSDL) 1.1", Internet Citati n, Mar. 15, 2001, <URL:http://www.w3.org/TR/wsdl> site visited Jun. 26, 2002.

U.S. Appl. No. 10/654,003, filed Sep. 4, 2003, Moreau.

* cited by examiner

ELECTRONIC DOCUMENT FOR DESCRIBING A COMPUTER SERVICE

The present invention relates to an electronic document for describing a computer service, that is to say a service proposed by a server computer in a communication network.

It also relates to a method of transforming an electronic document for describing a computer service, as well as to a method of comparing services on the basis of an electronic document for describing a service in accordance with the invention.

In a complementary manner, it relates to a transforming device and comparing device adapted to implement the methods of transforming and comparing in accordance with the invention.

Within a computer communication network, server computers offer services to other computers, called client computers, of the communication network.

Formerly, these services were accessible via proprietary protocols such as the CORBA protocol.

In order to facilitate the exchange of these services over communication networks where numerous computers may be connected, the services are increasingly often accessible via one or more communication protocols conforming to standards.

By way of example, these communication protocols may be the HTTP protocol ("HyperText Transfer Protocol"), or else the SMTP protocol ("Simple Mail Transfer Protocol"), this protocol generally being used for the exchange of electronic mail over the network, or else the FTP protocol ("File Transfer Protocol"), a protocol generally used for transferring files.

Moreover, the exchange of information between computers is itself increasingly often in accordance with standards, via for example the SOAP standard, corresponding to an application of the markup language XML ("eXtended Markup Language").

This SOAP standard enables computers to exchange information with each other in the form of blocks.

In practice, a message or a SOAP document is constituted by an envelope containing header blocks and body blocks.

The SOAP standard does not define a particular communication protocol, the SOAP messages in fact being able to be transmitted from one computer to another over a communication network by one of the communication protocols already described.

There is generally an interface layer between the messages presented in the SOAP format and the communication protocols, this layer being referred to as a "binding".

When a service is offered by a server computer, it is generally described in an electronic document.

Thus a WSDL ("Web Service Description Language") document is known which is particularly well-adapted to describe a service on a communication network.

This WSDL document is itself an application of the markup language XML.

A description of such a WSDL document may be found at "Web Services Description Language (WSDL) 1.1" W3C Note 15 Mar. 2001.

The electronic service description document essentially comprises two parts. A first part is adapted to describe in an abstract manner the messages exchanged between computers of the communication network when the service concerned is provided.

This first part is generally termed "abstract part".

A second part of the document is furthermore adapted to comprise information relating to the transmission of the messages over the communication network.

This second part, termed "concrete part", thus makes it possible to describe how a message is actually transmitted over the network.

In particular, this second part specifies the communication protocol which is actually used for the transfer of the messages, as well as the format in which the data will be represented for their communication within the communication network.

In an electronic document of WSDL type, this information relating to the transmission of the messages over the communication network is incorporated in a block delimited by "binding" tags making it possible in the same block to define both the communication protocol and the format of the different messages transmitted and received by the server computer of the communication network.

The actual representation used in such an electronic WSDL document makes it possible in a satisfactory manner to represent the services offered by a server computer when the server computer only operates according to a single communication protocol, associating for example the SOAP format with the HTTP communication protocol.

However, such an electronic document for describing a WSDL service is not adapted to be used in a communication network in which the client computers use different communication protocols, such that the server must itself propose services accessible according to different communication protocols.

This is because a server computer which offered exactly the same services in SOAP format via different protocols would, for each protocol, have to duplicate the information linked to the construction of the corresponding SOAP envelope. Thus the electronic document for describing a WSDL service would have to contain a plurality of second concrete parts, identical for the essential portion of the data apart from the value given for example to an attribute making it possible to define the protocol used to transport the messages.

Such an electronic service description document poses numerous problems, in particular concerning possible incoherence between the different service description documents. Furthermore, the updating of such a document gives rise to additional work, since the file is larger and since it requires action at a plurality of places in the document to carry out the update.

The object of the present invention is to overcome the aforementioned drawbacks and to provide an electronic service description document making it possible by virtue of its format to provide, in a simplified manner, the same service accessible using different communication protocols on the same server of a communication network.

To that end, the present invention relates to an electronic document for describing a service proposed by a server computer of a communication network, comprising a first part adapted to describe messages exchanged between computers of the communication network and a second part adapted to comprise information relating to the transmission of messages over the communication network.

According to the invention, the second part comprises two sub-parts, a first sub-part being adapted to comprise information on a format for representing messages and a second sub-part being adapted to comprise information on a communication protocol implemented for the transmission of the messages over the communication network.

Thus, by virtue of this partitioning of a second part of the electronic document, it is possible to simplify the description of a service by reducing the size of the files generated on a server that implements a plurality of communication protocols. The updating of these files is also facilitated since the parts of the electronic document to be updated are limited, independently of the communication protocols. The risks of error and of duplication are thus limited.

Furthermore, the comparison between such services becomes easier since it is possible to compare the operations performed by those services independently of the communication protocols used by the servers.

According to a preferred feature of the invention, the second sub-part comprises a reference pointing to information included in the first sub-part of the service description document.

Thus, different communication protocols described in a second sub-part may reference information included in a first sub-part, avoiding the duplication of that information for each of the communication protocols described in the service description document.

According to a preferred feature of the invention, when that document is represented in a markup language, the first and the second sub-parts are disjoint blocks, each block being bounded by a predetermined opening tag and closing tag.

By using a markup language of XML type in this way to present the service description document, such as is the case for an electronic document of WSDL type, it is possible to identify each of the sub-parts by a tag having a predetermined name.

According to another preferred feature of the invention, when a service comprises both first messages received by a server computer of the communication network and second messages sent by the communication server computer, the first sub-part is adapted to comprise information on a format for representing the first messages received by the server computer and for representing the second messages sent by the server computer.

It is thus possible to use the same format for representing messages received and sent by the computer, or else different formats chosen for example from a SOAP envelope, a URI electronic address or a MIME document.

According to another preferred feature of the invention, when a service comprises both first messages received by the server computer and second messages sent by the server computer of the communication network, the second sub-part is adapted to comprise information on a communication protocol implemented for receiving the first messages and for sending the second messages.

It is thus possible to use the same communication protocol, or else different communication protocols, for receiving the first messages and sending the second messages.

According to another aspect of the invention, a method of transforming an electronic document for describing a service proposed by a server computer of a communication network, comprising a first part adapted to describe messages exchanged between computers of the communication network and a second part adapted to comprise information relating to the transmission of messages over the communication network, comprises the following steps:
  extracting the first part;
  writing the first part in a transformed electronic document;
  extracting information relating to a format for representing the messages;
  writing the extracted information in a first sub-part of a second part of the transformed electronic document;
  extracting information relating to a communication protocol implemented for the transmission of the messages over the communication network; and
  writing the extracted information in a second sub-part of the second part of the transformed electronic document.

This method automatically enables the generation, from an electronic document for describing a service of WSDL type, of a document in a new format in accordance with the invention, making it possible, as previously described, by virtue of the separation of the encoding information and the information concerning the communication protocol, to simplify the description of the services on a communication network.

In a complementary manner, the present invention relates to a device for transforming an electronic document for describing a service proposed by a server computer of a communication network, comprising a first part adapted to describe messages exchanged between computers of the communication network and a second part adapted to comprise information relating to the transmission of messages over the communication network, comprising:
  means for extracting the first part;
  means for writing the first part in a transformed electronic document;
  means for extracting information relating to a format for representing the messages;
  means for writing the extracted information in a first sub-part of a second part of the transformed electronic document;
  means for extracting information relating to a communication protocol implemented for the transmission of the messages over the communication network; and
  means for writing the extracted information in a second sub-part of the second part of the transformed electronic document.

According to a third aspect of the invention, a method of comparing services based on an electronic service description document according to the invention comprises the following steps:
  identifying second sub-parts in the electronic document, pointing to the same first sub-part of a second part of said document; and
  displaying the information relating to the communication protocol included in each identified second sub-part.

It is thus possible on the basis of a service description document in accordance with the invention to identify for the same service the communication protocols that are accessible on the communication network.

In a complementary manner, the present invention relates to a device for comparing a service on the basis of an electronic service description document in accordance with the invention, comprising:
  means for identifying second sub-parts in the electronic document, pointing to the same first sub-part of a second part of said document; and
  means for displaying the information relating to the communication protocol included in each identified second sub-part.

The devices for transforming and comparing have similar advantages and features to the transforming method and the comparing method which they implement.

The present invention further comprises a fixed or partially or totally removable means for information storage, readable by a computer system, and which is adapted to store an electronic service description document in accordance with the invention.

It also relates to a computer and to a communication network that are adapted to implement the transforming method and/or the comparing method according to the invention.

The present invention furthermore relates to a means for information storage, possibly totally or partially removable, that is readable by a computer system, comprising instructions for a computer program adapted to implement the method of transforming an electronic document and/or the comparing method according to the invention, when that computer program is loaded and executed by the computer system.

Finally, the present invention also relates to a computer program which can be read by a microprocessor, comprising portions of software code adapted to implement the transforming and/or comparing methods according to the invention, when said computer program is loaded and executed by the microprocessor.

Further particularities and advantages of the invention will emerge from the following description.

In the accompanying drawings, given by way of non-limiting example.

Figure 1:
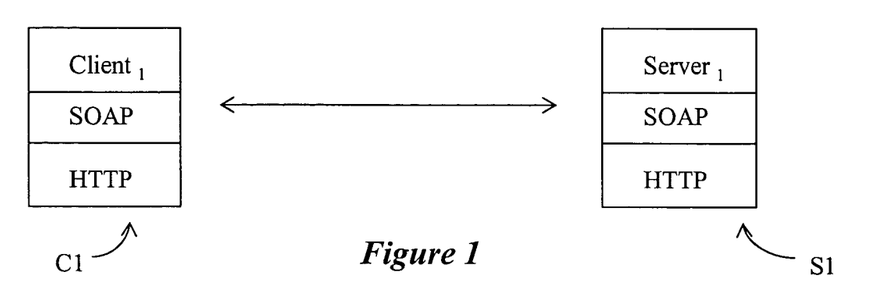
FIGS. 1, 2, and 3 illustrate different configurations of a communication network in which a server computer is adapted to propose one or more services to client computers.

In FIG. 1 a first type of communication network has been illustrated in which a client computer C1 is adapted to communicate with a server computer S1.

In particular, in this type of communication network, the server computer S1 offers services to a client computer C1.

In this embodiment, these services are accessible via a communication protocol in accordance with a standard, SOAP 1.2, which may be consulted at "SOAP Version 1.2 Part 1: Messaging Framework", W3C Working Draft 26 Jun. 2002.

In this communication protocol, a SOAP envelope defining the message to be transmitted is in fact transmitted over the communication network via the communication protocol HTTP.

A SOAP service is in general described by a WSDL document, in a language specially adapted to the description of such a service.

A WSDL document contains principally two parts. A first part, called the abstract part, describes in an abstract manner the messages which are exchanged between computers of the communication network on the implementation of the service. A second part is adapted to comprise concrete information, defining the transmission of the messages over the communication network.

The first part is itself divided into three sub-parts.

The first sub-part of this first part contains declarations of types, enabling the abstract structure of the messages to be described. These types are then referenced in the second sub-part of the first part of the WSDL document.

The declaration of these types is generally achieved by means of tags <types> . . . </types>.

This declaration of types is well-known in documents written in XML language and it is not essential for the understanding of the invention to describe the types used in more detail.

The second sub-part of the first part of the document contains declarations of elementary messages. It thus defines the messages which will be exchanged between the computers on the implementation of the service, without precisely describing the content or sequence.

By way of example, and solely to facilitate the understanding of the present invention, the following three messages may be exchanged between the computers C1 and S1. This second sub-part does not define the links that exist between these different messages.

a. The first message corresponds to a request to obtain the quantity of a product in stock. The product is identified by its inventory number ("Part Number"):

```
<message name="getQuantityInStockInput">
    <part name="PartNumber" />
</message>
``` b. The second message conveys the available quantity of a product currently in stock:

```
<message name="getQuantityInStockOutput">
    <part name="PartNumber" />
    <part name="QuantityActuallyInStock" />
</message>
``` c. The third message corresponds to a request to update a quantity of product in stock:

```
<message name="setQuantityInStockInput">
    <part name="PartNumber" />
    <part name="NewQuantityInStock" />
</message>
```

A third sub-part of the first part of a WSDL document makes it possible to group together the elementary messages thus defined in the two first sub-parts in logic operations.

An operation may be considered as an elementary service, the latter itself being implemented by one or more messages.

In the example below, the first two elementary messages introduced above are grouped together in the same logic operation ("getQuantityInStock"). This operation makes it possible to obtain the quantity of product currently available.

Furthermore, the elementary message "getQuantityInStockInput" is declared as being of request type ("input"), and the elementary message "getQuantityInStockOutput" as being of response type ("output"). Finally, the messages are linked as one being the response to the other and being grouped together in the same operation, and being placed in the order "input", then "output".

In addition, a second logic operation ("setQuantityInStock") is declared as being constituted by a single request message "setQuantityInStockInput":

```
<portType name="stockMgt">
    <operation name="getQuantityInStock">
        <input message="getQuantityInStockInput"/>
        <output message="getQuantityInStockOutput"/>
    </operation>
    <operation name="setQuantityInStock">
        <input message="setQuantityInStockInput"/>
    </operation>
</portType>
```

Clearly, more sophisticated forms of operations, consisting of a complex set of exchanges of messages, could be described in this language.

This first part of the WSDL document thus makes it possible to define the type, content and order of the messages exchanged between computers of the network on the implementation of a service proposed by the server computer S1.

The WSDL document further comprises, as explained previously, a second part which makes it possible to specify which protocol is actually used to transmit the messages and what form of encoding or representation format is used to represent these data in a form adapted to the communication network.

Taking the preceding example again, this second part of a WSDL document may be presented in the following manner:

```
<binding name="stockMgtSoap" type="stockMgt">
    <soap:binding
    transport="http://schemas.xmlsoap.org/soap/http"
        <operation name="getQuantityInStock">
            <input>
                <soap:body part="PartNumber"/>
            </input>
            <output>
                <soap:body part="PartNumber"/>
                <soap:body part="QuantityActuallyInStock"/>
            </output>
        </operation>
        <operation name="setQuantityInStock">
            <input>
                <soap:body part="PartNumber"/>
                <soap:body part="NewQuantityInStock"/>
            </input>
        </operation>
</binding>
```

This second part of the WSDL document thus indicates in particular that the elementary messages defined in the first part are in SOAP format; this is indicated by presence in a number of places in this second part of the prefix or namespace defined by the term "SOAP:".

For all the operations defined in this second part, the transmission protocol of the messages will be the HTTP protocol. This protocol is indicated in particular by the attribute "transport" of the tag "soap:binding".

Furthermore, this second part specifies that for the request message, defined by the tag "input" the SOAP envelope will contain in a block of the body the part number "Part Number" of the product desired.

For the response message, defined by the tag "output" the SOAP envelope will contain, in two body blocks, the part number of the product as well as the quantity of product available.

Such an electronic service description document makes it possible to satisfactorily represent the services offered by the server S1 of FIG. 1.

This is because, in this case, the server S1 only offers its services through the intermediary of a single protocol, combining a SOAP envelope with the HTTP communication protocol.

Figure 2:
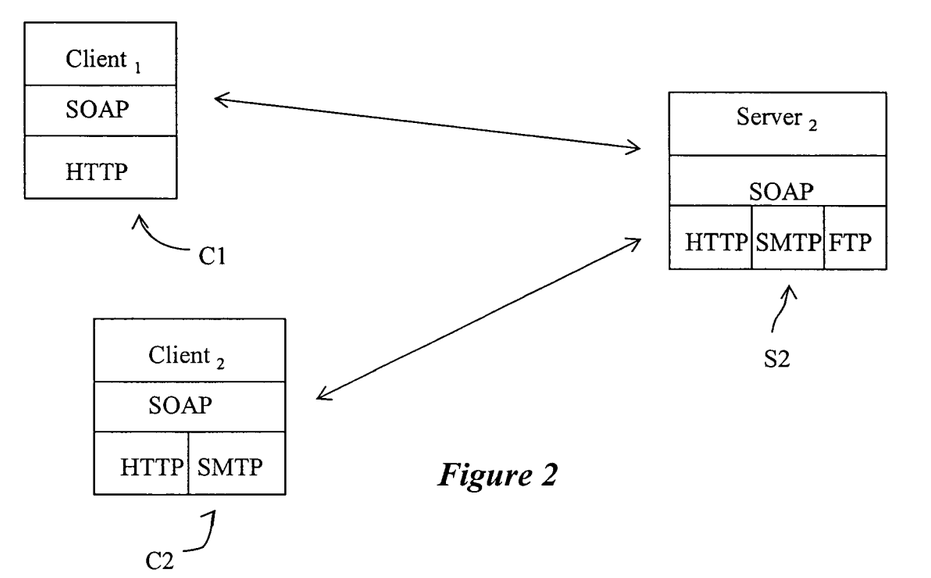

However, such an electronic description document is not adapted to describe a service provided by a second server S2 as illustrated in FIG. 2.

This is because, in this second server S2, the same SOAP envelope may be conveyed equally by different transport protocols, defined earlier, such as the HTTP, SMTP or FTP protocols.

The server S2 thus offers exactly the same SOAP service accessible via different communication protocols which may be adapted to certain clients.

In the example of FIG. 2, in addition to the first client C1 which is identical to that described earlier with reference to FIG. 1, the communication network also comprises a second client C2 which is adapted to communicate over the communication network not only via the HTTP protocol but also via the SMTP protocol.

Figure 3:
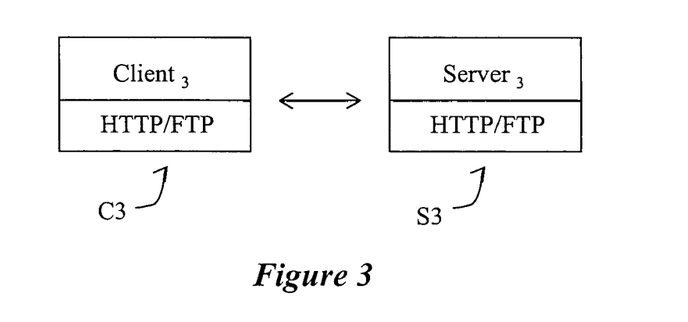

Similarly, the document described previously does not apply either in a network as illustrated in FIG. 3 in which the communication protocols such as HTTP or FTP, or possibly SMTP, are directly used, without the intermediary of a SOAP envelope.

If it were to be desired to make such an electronic description document compatible with the different communication networks described in FIGS. 1, 2 and 3, the WSDL document would have to comprise a plurality of second parts defined by a "binding" tag. These second parts would comprise numerous items of information in common, only the type of protocol used (for example via the attribute "transport" of the "soap:binding" tag) being modified.

Such a description document, in addition to its excessive size due to the redundancy of the information written in its second concrete part, leads to the risk of incoherency and error at the time of its generation and is relatively fastidious to formulate and update.

Figure 4A:
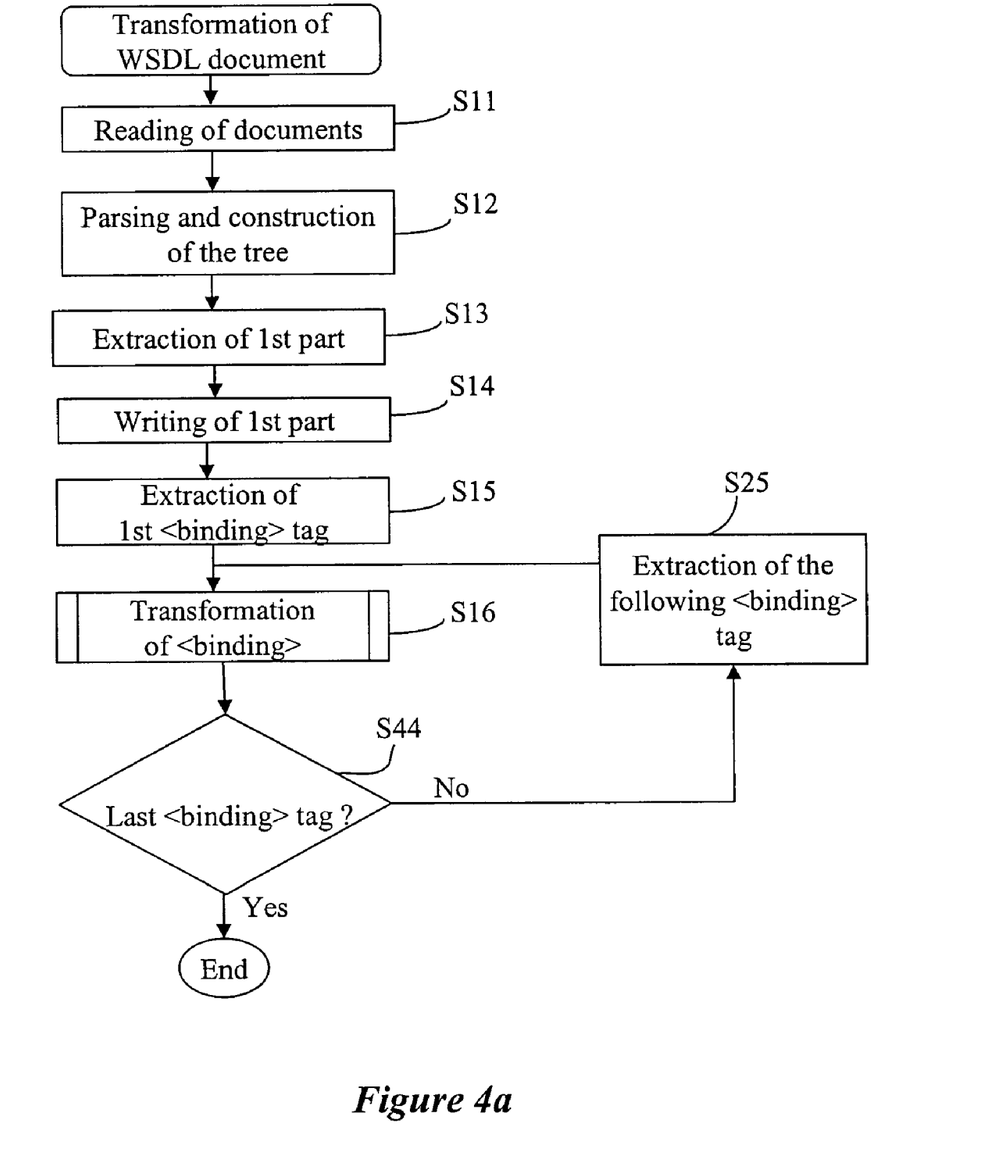
FIGS. 4a, 4b and 4c are algorithms illustrating the method of transforming an electronic service description document in accordance with the invention.
Figure 4B:
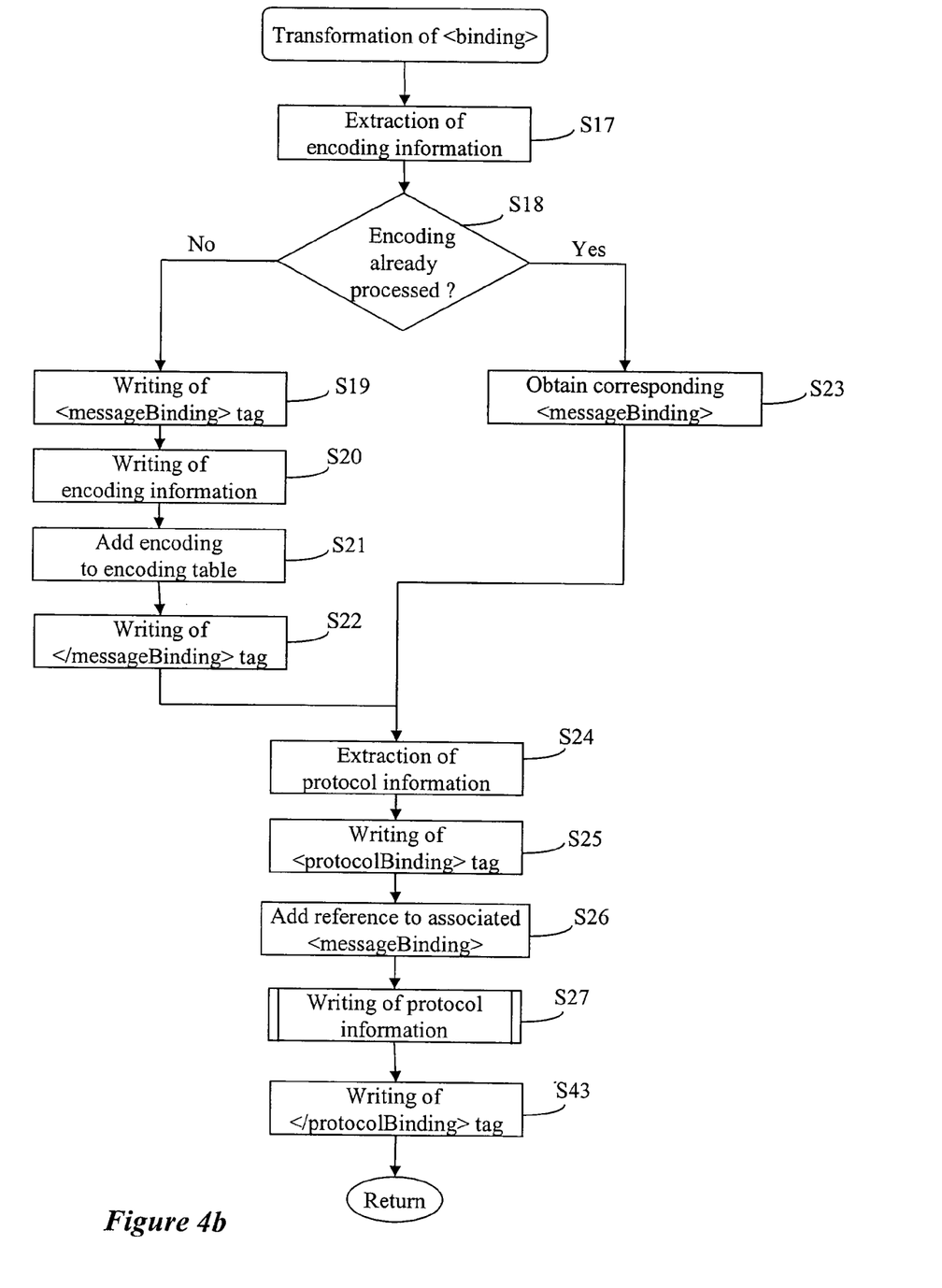
Figure 4C:
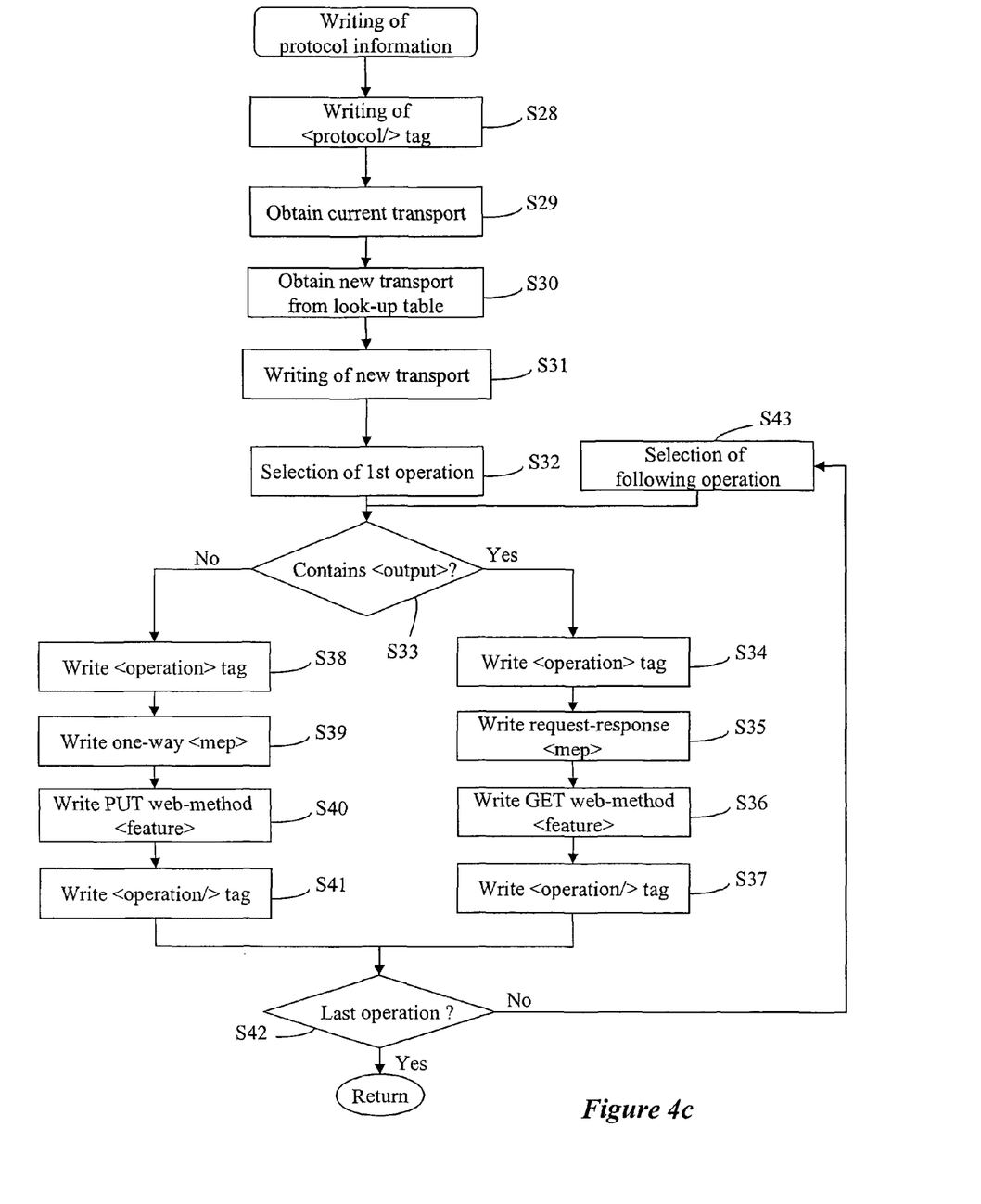

In order to overcome these drawbacks, according to one of its aspects the invention provides a method of transforming such a WSDL document as described in FIGS. 4a, 4b and 4c.

The method of transforming an electronic WSDL document as previously described comprises firstly a step S11 of reading the document.

This WSDL document being written in a markup language of XML type, a step of parsing and of constructing a tree S12 makes it possible to represent the document in hierarchical form, each node of the constituted tree thus corresponding to a tag of the XML document.

An extracting step S13 makes it possible to extract first of all the first part of the document as described earlier. That first part is written in a writing step S14 in the transformed electronic document.

That first part, corresponding to the abstract part of the WSDL document, is not modified in the transformed electronic document and is in reality simply copied.

Next in an extracting step S15 the second part of the WSDL document is extracted which corresponds to the concrete part of the document.

In practice, extraction is made of the first <binding> tag in which is stored the information on the transmission of the messages over the communication network, by identifying its name.

A transforming step S16 is next adapted to modify the structure of the information included in that <binding> tag.

This transforming step S16 is detailed in FIG. 4b.

An extracting step S17 is adapted to extract the information relating to the format of representing the messages, that is to say relating to the encoding of the information.

A test step S18 makes it possible to verify if that type of encoding has already been dealt with. In the negative, a writing step S19 is then implemented to write a <messageBinding> opening tag in the transformed description document.

This tag thus makes it possible to define a first sub-part in the second part of the transformed document, adapted to comprise the information relating to the format of the messages.

Further to that opening tag, a writing step S20 is implemented in order to insert the encoding information extracted earlier.

An adding step S21 makes it possible to add the encoding to a table of the forms of encoding used at the test step S18 to determine whether the encoding has already been dealt with.

Next, a writing step S22 makes it possible to delimit that sub-part by a </messageBinding> closing tag.

If, at the issue of the test step 18, the encoding has already been dealt with, that is to say that the encoding information has been stored in the table at the adding step S21, an obtaining step S23 makes it possible to obtain the information stored in the corresponding <messageBinding> tag.

An extracting step S24 is next implemented on the XML document to transform in order to identify the information relating to the communication protocol, that is to say in the above example the information relating to the HTTP protocol for transfer of messages over the communication network.

A writing step S25 makes it possible as previously to introduce a new <protocolBinding> opening tag, adapted to delimit that second sub-part of the second part of the transformed description document.

An adding step S26 makes it possible to include after the preceding opening tag a reference to the associated <messageBinding> tag.

That reference may be made by virtue of the "binding" pointer enabling the name of the <messageBinding> tag to be referenced.

A writing step S27 is next adapted to insert within that tag the protocol information identified previously.

This writing step S27 is detailed in FIG. 4c.

It comprises first of all a step S28 of writing a <protocole/> tag.

An obtaining step S29 makes it possible to obtain the value of the transport attribute used in the WSDL document to transform.

Here, the value of that attribute is equal to the http:// link at schemas.xmlsoap.org/soap/http.

An obtaining step S30 makes it possible to obtain a new value for that attribute in a look-up table.

For the protocols already known, the following correspondences, which can be found at the following http:// links, are used.
schemas.xmlsoap.org/soap/http->
www.w3.org/2002/06/soap/bindings/HTTP
schemas.xmlsoap.org/soap/smtp/->
www.example.org/2002/02/soap/bindings/Email
schemas.xmlsoap.org/soap/ftp/->
www.crf.canon.fr/2002/soap/bindings/FTP For the other protocols, the table must be up to date when those protocols are made available to the users.

Here the value corresponding to the preceding attribute is the protocol found at the http:// link of www.w3.org/2002/06/soap/bindings/HTTP, which corresponds to the HTTP protocol implemented with the SOAP standard.

This protocol name is thus written in the <protocole> tag in a writing step S31.

A selection step S32 make it possible to select a first operation, such as the operation "getQuantityInStock".

A test step S33 makes it possible to verify if that operation contains messages of <output> type, that is to say messages requiring a response.

In the affirmative, for example for the operation "getQuantityinStock", a writing step S34 is adapted to write an <operation> tag.

A writing step S35 is adapted to write an MEP ("Message Exchange Pattern") functionality, by use of a <mep> tag.

This <mep> tag is used to define a pattern for message exchange between a plurality of SOAP nodes. Here, this pattern is of request-response type such that a first computer sends a message to a second computer which sends it back a response message.

This type of <mep> tag uses the MEP concept defined by SOAP of which a detailed description may be obtained at the electronic address for the http:// link at www.w3.org/TR/2002/WD-soap12-part1-20020626/#soapmep.

A writing step S36 is furthermore adapted to add another functionality or <feature> associated with the communication protocol.

This <feature> functionality is named here "web-method" by way of example, having a "Method" property of which the value may for example be set to GET.

The identifier of the "web-method" feature is http://www.w3.org/2002/06/soap/features/web-method.

Similarly, this <feature> tag uses the feature concept defined by SOAP of which a detailed description may be obtained at the electronic address http://www.w3.org/TR/2002/WD-soap 12-part1-20020626/#soapfeature.

It is not necessary to give more detail of the use of these particular tags for the understanding of the invention.

In a nutshell, here, it is indicated that the protocol uses the HTTP GET method.

The insertion of the information relating to that operation is terminated by a writing step S37 making it possible to write an<operation/> closing tag.

If at the issue of test S33, the operation to process does not contain a response message of type <output>, such as is the case for the operation "setQuantityInStock", the information relating to the protocol is modified in the following manner. A writing step S38 makes it possible to write an <operation> tag as in the preceding writing step S34.

A step S39 of writing an MEP functionality is also implemented. Here, the value of this <mep> tag is equal to "one way" since that operation only requires the implementation of a single message requiring no response.

The identifier of the one-way MEP is http://www.crf.canon.fr/2002/05/soap/mep/one-way.

As previously, a writing step S40 may be implemented to add <feature> functionalities to the communication protocol.

Here, By way of example, the name of that functionality is also "web-method", having a property "Method" of which the value is set to PUT.

A writing tag S41 is next implemented in a similar manner to the writing step S37 to insert an<operation/> closing tag making it possible to delimit the information relating to the communication protocol used for that operation.

In a test step S42 it is verified if all the operations have been processed. In the negative, a selecting step S43 makes it possible to select the following operation and the set of steps S33 to S42 is reiterated for that operation.

When all the operations have been processed, this step S27 of writing the information relating to the protocol is terminated.

Returning to FIG. 4b, a writing step S43 is adapted to write a </protolBinding> closing tag making it possible to close that second sub-part of the message comprising the information relating to the communication protocol.

This step S16 of transforming a <binding> tag is thus terminated.

Returning to FIG. 4a, in a test step S44 it is verified if that tag so processed corresponds to the last <binding> tag.

In the negative, a following <binding> tag is extracted and the set of steps S16 to S44 are reiterated on that tag.

When all the <binding> tags have been processed, the method of transforming the WSDL document is terminated.

The transformation of the electronic WSDL description document makes it possible to obtain a document of which the second part appears as follows:

```
<messageBinding name="stockMgtSoap"type="stockMgt">
    <operation name="getQuantityInStock">
        <input>
            <soap:urlEncoded part=" PartNumber"/>
        </input>
        <output>
            <soap:body part="PartNumber"/>
            <soap:bodypart="QuantityActuallyInStock"/>
        </output>
    </operation>
    <operation name="setQuantityInStock">
        <input>
            <soap:body part="PartNumber"/>
            <soap:body part="NewQuantity"/>
        </input >
    </operation>
</messageBinding>
<protocolBindingname="stockMgtSoapHttp"
binding="stockMgtSoap">
    <protocol name="w3c-soap12-http11"/>
    <operation name="getQuantityInStock">
        <mep     name="request-response"/>
        <feature name="web-method">
            <property name="webmeth:Method" value="GET"/>
        </feature>
    </operation>
    <operation name="setQuantityInStock">
        <mep     name="one-way"/>
        <feature name="web-method">
            <property name="webmeth:Method" value="PUT"/>
        </feature>
    </operation>
</protocolBinding>
```

This second document part is thus partitioned into two sub-parts, a first sub-part comprising the information relating to the format for representing the messages and the second sub-part comprising the information on the communication protocol implemented for the transmission of the messages over the communication network.

When as here the document is represented in a markup language such as XML, the sub-parts are disjoint blocks each bounded by an opening tag and a closing tag. Thus the first sub-part is included in the "messageBinding" tag and the second sub-part is included in the "protocolBinding" tag.

The second sub-part comprises a reference identifying the first sub-part, by means of the "binding" pointer. Here the value of the "binding" pointer is "StockMgtSoap" which corresponds to the name of the "messageBinding" tag, described in the first sub-part.

Furthermore, in the preceding example, the message for requesting the "getQuantityinStock" operation, i.e. a message transmitted by the server computer, is encoded in the form of a URI electronic address.

The response message of this same operation, i.e. a message received by the server computer of the communication network, is encoded in the form of a SOAP envelope.

Thus, the first sub-part of the document may comprise information in a different representation format depending on whether the message is received by the server computer or transmitted by that server computer.

In the second sub-part of the transformed service description document, only the information relating to the communication protocol are described, independently of the type of encoding chosen and determined in the first sub-part of the second part of the document.

In this example, the protocol corresponds to the HTTP communication protocol via the SOAP application layer.

This communication protocol is in this example identical for all the operations, as well as for the messages transmitted and the messages received by the server.

By virtue of this structure of the document, when it is desired to change solely the communication protocol, for example on implementing a service by the second server S2 illustrated in FIG. 2, it suffices to solely modify this second sub-part of the message defined by the "protocol Binding" tag.

By way of example, this second part of the service description document may appear in the following manner when the SMTP protocol has been chosen to use for the messages transmitted by the server computer and the HTTP protocol for the messages received by the server computer.

```
<protocolBinding
    name="stockMgtSoapEmailInHttpOut"
    binding="stockMgSoap">
    <operation name="getQuantityInStock">
        <mep name="request-response"/>
        <input>
            <protocol name="ietf-http11"/>
        </input>
        <output>
            <protocol name="ietf-email"/>
        </output>
    </operation>
</protocolBinding>
```

These protocols are thus defined via the "protocol Binding" tag by elementary messages since the protocols for the outgoing and return of the messages are different.

On the other hand, the MEP model is specified at the level of each operation.

In the same way, the associated protocol may be defined for other types of operation, for example for the updating operation. By way of example, the SMTP protocol may be used such that the second sub-part of the description document appears in the following manner:

```
<protocolBinding
    name="stockMgtSoapEmail"
    binding="stockMgtSoap">
    <protocol name="w3c-soap12-email"/>
    <operation name="setQuantityInStock">
        <mep name="one-way"/>
        <input>
            <field name="X-Mailer" value="SOAP Email">
                <parameter name="version" value="1.23"/>
            </field>
        </input>
    </operation>
</protocolBinding>
```

In this example, the models of the MEP exchanges are of one-way type, that is to say a request without response. This is because this updating operation does not require any response on the part of the client computer.

Furthermore, in the preceding example, a protocol field "field" is used to define the value of a protocol header.

When a client computer generates a message based on the preceding WSDL document, this message must indicate the "X-mailer" field in the following format:

"X-mailer: SOAP Email; version=1.23"

The main value of the "X-mailer" field is "SOAP Email" and the parameters of this field are defined by the "version" attribute of which the value is "1.23".

Thanks to the separation of the second part of the description document between a first part adapted to comprise the format information of the messages and a second part comprising the protocol information, it is found that there is no duplication of information between the above examples. This separation thus makes it possible to reduce duplication, and thus to reduce the size of the service description document, to limit risks of error and to simplify the problems of updating the service description document.

Moreover, the comparison of a service procured by a server computer of a network becomes easier.

This is because it is easy to examine whether two operations having different protocols are compatible, since that will be the case if these protocols point (i.e. use) the same representing the messages defined by the same "messageBinding" block.

Figure 5:
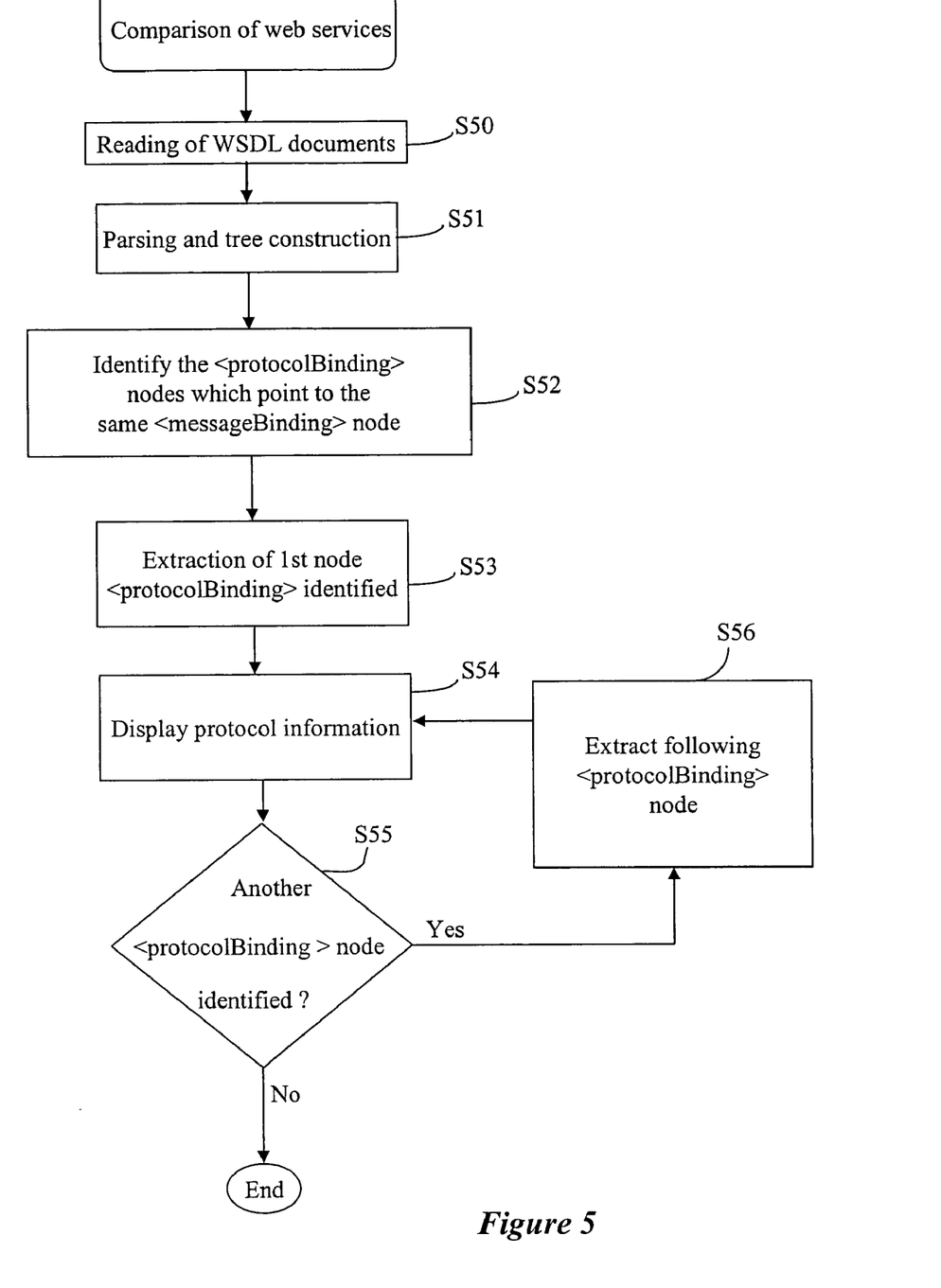
FIG. 5 is an algorithm illustrating the method of comparing a service on the basis of an electronic service description document in accordance with the invention.

In practice, as illustrated in FIG. 5, it is thus possible to compare the services provided by a server computer on the basis of an electronic service description document This method of comparing comprises a step S50 of reading the WSDL document and a step S51 of parsing adapted to analyze the structure of the document and to construct the tree associated with that document as previously described.

An identification step S52 is adapted to identify the <protocolBinding> nodes which point to the same <messageBinding> node.

The second sub-parts pointing to the same first sub-part are thus identified in the document.

The extraction step S53 is adapted to extract the first <protocolBinding> node identified.

A display step S54 is next adapted to display the information relating to the communication protocol included in that first <protocolBinding> tag.

A test step S55 makes it possible to verify if there is another <protocolBinding> node identified. In the affirmative, in an extraction step S56 the following <protocolBinding> node is extracted and the step S54 is reiterated, of displaying the protocol information in that following node.

When at the issue of the test step S55 all the nodes identified have been processed, the method of comparing implemented on the electronic service description document is terminated.

Although an embodiment has been described above in which the communication protocols are coupled with the SOAP standard of message representation, the present invention equally applies when protocols such as HTTP, FTP or SMTP are used directly, i.e. without the SOAP application layer.

An example of an electronic service description document is given below for the "getQuantityinStock" operation.

```
<messageBinding name="stockMgtURI"type="stockMgt">
    <operation name="getQuantityInStock">
        <input>
            <http:urlEncoded/>
        </input>
        <output>
            <mime:mimeXml part="Body"/>
```

-continued

```
        </output>
    </operation>
</messageBinding>
<protocolBinding name="stockMgtHttp"binding="stockMgtURI">
    <protocol name="ietf-http11"/>
    <operation name="getQuantityInStock">
        <mep name="request-response"/>
        <feature name="web-method">
            <property name="webmethod:Method"value="GET"/>
        </feature>
    </operation>
</protocolBinding>
```

In this example, the first sub-part "messageBinding" comprises solely the encoding information, to the exclusion of any information on the communication protocol.

In this example, the message transmitted by the server computer is represented in the form of a URI address, whereas the message received by the server computer is represented in the form of a MIME document.

The communication protocol is defined within the second sub-part included in the "<protocolBinding>" tag, and is here by way of example the HTTP protocol.

As previously, the options linked to this communication protocol and introduced into the tags MEP and FEATURE are also specified for each operation.

In order to implement the transforming method described with reference to FIGS. 4a, 4b and 4c, a transforming device essentially comprises means for reading a document, means for parsing the document in order to construct a tree representing the hierarchical structure of the document, as well as means for extracting and writing adapted to identify different parts of the document and to write those parts in a transformed electronic document.

Similarly, a device for comparing adapted to implement the comparing method described with reference to FIG. 5 comprises means for reading and parsing as previously described as well as means for identifying the <protocolBinding> nodes pointing to the same <messageBinding> node, means for extracting these identified nodes and for displaying the information relative to the communication protocol stored in each of these nodes.

Figure 6:
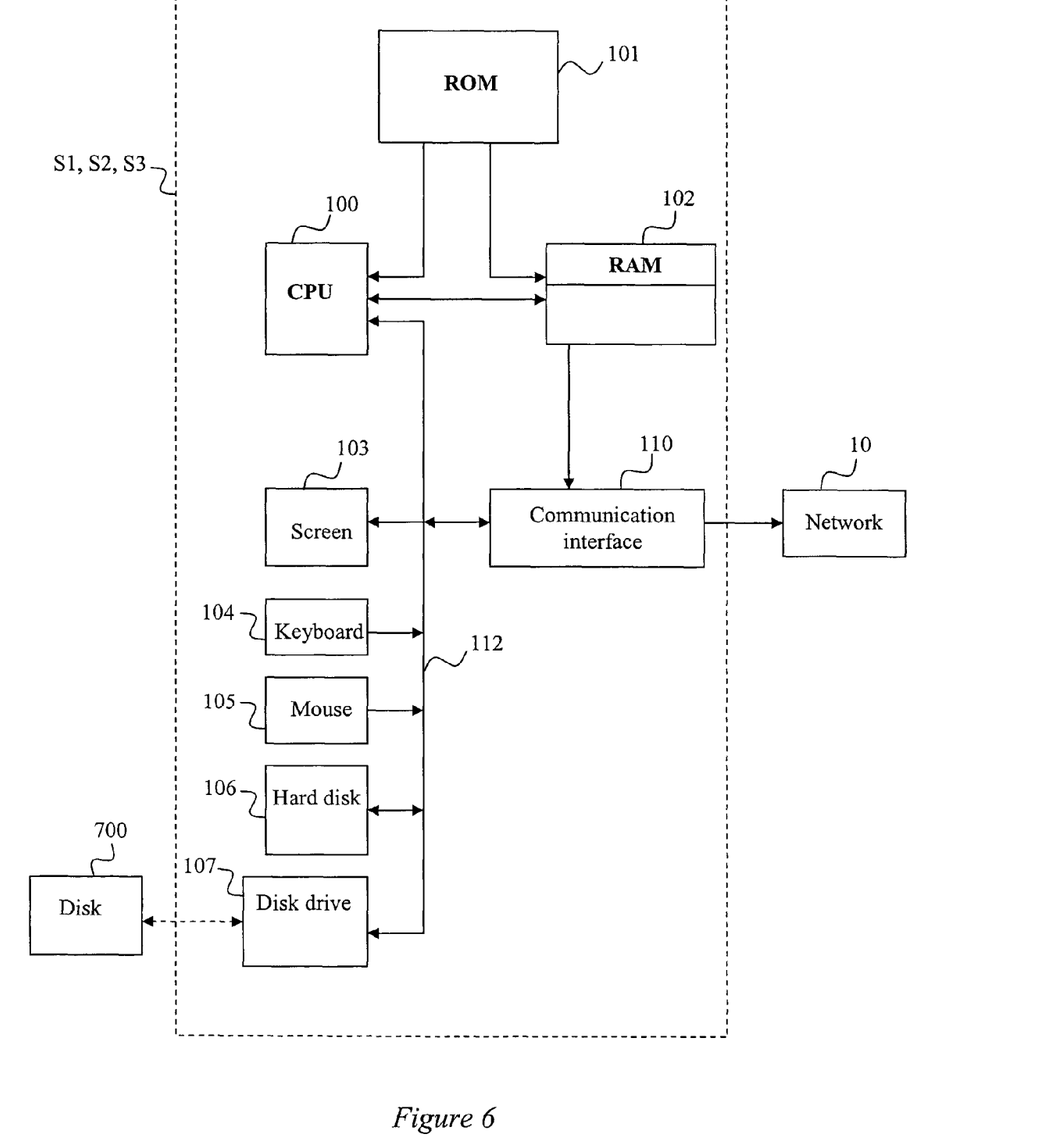
FIG. 6 is a block diagram illustrating a device adapted to implement the transforming and comparing methods in accordance with the invention.

These devices for transformation and comparison may be incorporated in a computer as illustrated in FIG. 6.

In particular, the different means identified above may be incorporated in a microprocessor 100, a read-only memory (or ROM) 101 being adapted to store a program for transforming and/or comparing in accordance with the invention.

Of course, these devices for transforming a document or comparing a service may be implemented in the same computer or else in different stations of the communication network.

The random-access memory or RAM 102 is adapted to store in registers the values modified on execution of the program for transforming and comparing.

The microprocessor 100 is integrated into a computer which may be connected to different peripherals and to other computers of the communication network 1 as illustrated in FIGS. 1 to 3. In particular, this computer corresponds to a server computer S1, S2, S3 of these networks.

That computer S1, S2, S3 comprises in known manner a communication interface 110 connected to the communication network 10 to receive or transmit messages.

The computer further comprises means for storage of documents, such as a hard disk 106 or is adapted to cooperate by means of a disk drive 107 (diskettes, compact discs or computer cards) with removable document storage means such as disks 700. These fixed or removable storage means may comprise the code of the transforming or comparing method according to the invention.

They are also adapted to store an electronic service description document as defined by the present invention.

As a variant, the program enabling the transforming or comparing device to implement the invention can be stored in the read only memory 101.

As a second variant, the program can be received and stored as described previously by means of the communication network 10.

The computer S1, S2, S3 also has a screen 103 which may for example serve as an interface with an operator with the use of the keyboard 104 or the mouse 105 or of any other means.

The central processing unit 100 (CPU) will then execute the instructions relating to the implementation of the invention. On powering up, the programs and methods relating to the invention, stored in a non-volatile memory, for example the read-only memory 101, are transferred into the random-access memory 102, which will then contain the executable code of the invention as well as the variables necessary for implementing the invention.

The communication bus 112 affords communication between the different sub-elements of the computer 10 or connected to it.

The representation of the bus 112 is not limiting and in particular the microprocessor 100 is able to communicate instructions to any sub-element directly or by means of another sub-element.

Naturally, numerous modifications can be made to the example embodiments described above without departing from the scope of the invention.

The invention claimed is:

1. An electronic document represented in a markup language stored on a computer readable storage medium, the document describing a service proposed by a server computer of a communication network, comprising:
   a first part comprised of code describing messages exchanged between computers of the communication network on implementation of the service; and
   a second part comprised of code comprising information defining the transmission of said messages over the communication network, wherein said second part comprises two sub-parts, a first sub-part comprising information describing a form of encoding or representation format used to represent said messages and a second sub-part comprising, for at least one predefined communication protocol, information describing functionalities of said communication protocol, said functionalities being implemented for the transmission of said messages over the communication network using said communication protocol,
   wherein said the first sub-part and second sub-part of said second part are disjoint blocks, each block being bounded by a predetermined opening tag and closing tag,
   wherein said predetermined opening tag and closing tag of the first sub-part comprise a messageBinding tag, and the predetermined opening tag and closing tag of the second sub-part comprise a protocolBinding tag, and
   wherein, in a case where a plurality of communication protocols are implemented to offer said service to various clients over the communication network, the description of said form of encoding or representation format is not duplicated in the electronic document and said service is accessible via said plurality of communication protocols by said various clients.

2. An electronic document according to claim 1, wherein said second sub-part comprises a reference pointing to information included in said first sub-part.

3. An electronic document according to claim 1, wherein said first part defines the type, content and order of the messages.

4. An electronic document according to claim 1, wherein the document is a WSDL (Web Services Description Document).

5. An electronic document according to claim 1, wherein first messages are received by the server computer of the communication network and second messages are sent by the server computer of the communication network, and wherein said first sub-part comprises information defining the format used to represent said first messages received by the server computer and said second messages sent by the server computer.

6. An electronic document according to claim 5, wherein the format used to represent said first messages received by said server is different from the format used to represent said second messages sent by the server computer.

7. An electronic document according to claim 1, wherein the format used to represent said messages included in the first sub-part comprise one of a SOAP envelope, a URI address or a MIME document.

8. An electronic document according to claim 1, wherein first messages are received by the server computer of the communication network and second messages are sent by the server computer, wherein said second sub-part comprises information describing functionalities of said communication protocol implemented for receiving said first messages and for sending said second messages.

9. An electronic document according to claim 8, wherein the communication protocol implemented for receiving said first messages is different from the communication protocol implemented for sending said second messages.

10. A method, implemented in a computer, of transforming an electronic document represented in a markup language, the document describing a service proposed by a server computer of a communication network, said electronic document comprising a first part comprised of code describing messages exchanged between computers of the communication network on implementation of the service, and a second part comprised of code comprising information defining the transmission of said messages over the communication network, the method comprising the following steps:
   a first extracting step of extracting said first part from the electronic document;
   a first writing step of writing said extracted first part into a transformed electronic document;
   a second extracting step of extracting, from the electronic document, information describing a form of encoding or representation format used to represent the messages;
   a second writing step of writing said information extracted by said second extracting step into a first sub-part of a second part of the transformed electronic document;
   a third extracting step of extracting, from the electronic document, for at least one predefined communication protocol, information describing functionalities of said predefined communication protocol, said functionalities being implemented for the transmission of said messages over the communication network using said communication protocol; and
   a third writing step of writing said information obtained from the information extracted by said third extracting step into a second sub-part of the second part of said transformed electronic document, wherein said first sub-part and second sub-part of said second part are disjoint blocks, each block being bounded by a predetermined opening tag and closing tag, wherein said predetermined opening tag and closing tag of the first sub-part comprise a messageBinding tag, and the predetermined opening tag and closing tag of the second sub-part comprise a protocolBinding tag, and wherein, in a case where a plurality of communication protocols are implemented to offer said service to various clients over the communication network, the description of said form of encoding or representation format is not duplicated in the electronic document and said service is accessible via said plurality of communication protocols by said various clients.

11. A method according to claim 10, further comprising upstream and downstream of each of said writing steps, steps of inserting an opening tag and a closing tag in the transformed electronic document.

12. A method, implemented in a computer, of comparing services provided by a server computer, the method comprising the steps of:

receiving, by the server computer, an electronic service description document represented in a markup language, the document describing a service proposed by the server computer of a communication network, the document comprising a first part comprised of code describing messages exchanged between computers of the communication network on implementation of the service, and a second part comprised of code comprising information defining the transmission of said messages over the communication network, wherein said second part comprises two sub-parts, a first sub-part comprising information describing a form of encoding or representation format used to represent said messages and a second sub-part comprising, for at least one predefined communication protocol, information describing functionalities of said predefined communication protocol, said functionalities being implemented for the transmission of said messages over the communication network using said communication protocol, wherein said first sub-part and second sub-part of said second part are disjoint blocks, each block being bounded by a predetermined opening tag and closing tag;

identifying second sub-parts in the electronic document, pointing to the same first sub-part of the second part of said document;

extracting, from the electronic document, each second sub-part identified in the identifying step; and displaying on a display device the information defining the communication protocol included in each identified second sub-part;

wherein said predetermined opening tag and closing tag of the first sub-part comprise a messageBinding tag, and the predetermined opening tag and closing tag of the second sub-part comprise a protocolBinding tag; and wherein, in a case where a plurality of communication protocols are implemented to offer said service to various clients over the communication network, the description of said form of encoding or representation format is not duplicated in the electronic document and said service is accessible via said plurality of communication protocols by said various clients.

13. A device for transforming an electronic document represented in a markup language, the document describing a service proposed by a server computer of a communication network, the electronic document comprising a first part comprised of code describing messages exchanged between computers of the communication network on implementation of the service, and a second part comprised of code comprising information defining the transmission of the messages over the communication network, the device comprising:

a first extracting unit that extracts said first part from the electronic document;

a first writing unit that writes said extracted first part into a transformed electronic document;

a second extracting unit that extracts, from the electronic document, information describing a form of encoding or representation format used to represent said messages;

a second writing unit that writes said information extracted by the second extracting unit into a first sub-part of a second part of the transformed electronic document;

a third extracting unit that extracts, from the electronic document, for at least one predefined communication protocol, information describing functionalities of said predefined communication protocol, said functionalities being implemented for the transmission of said messages over the communication network using said communication protocol; and a third writing unit that writes said information obtained from the information extracted by said third extracting unit in a second sub-part of said second part of the transformed electronic document, wherein said first sub-part and said second sub-part of the second part of the transformed electronic document are disjoint blocks, each block being bounded by a predetermined opening tag and closing tag, wherein said predetermined opening tag and closing tag of the first sub-part comprise a messageBinding tag, and the predetermined opening tag and closing tag of the second sub-part comprise a protocolBinding tag, and wherein, in a case where a plurality of communication protocols are implemented to offer said service to various clients over the communication network, the description of said form of encoding or representation format is not duplicated in the electronic document and said service is accessible via said plurality of communication protocols by said various clients.

14. A device according to claim 13, further comprising an inserting unit that inserts an opening tag and a closing tag in the transformed electronic document respectively upstream and downstream of said first part, of said first sub-part and of said second sub-part.

15. A device for comparing services provided by a server computer, comprising:

a receiving unit that receives an electronic service description document represented in a markup language, the document describing a service proposed by the server computer of a communication network, the document comprising a first part comprised of code describing messages exchanged between computers of the communication network on implementation of the service, and a second part comprised of code comprising information defining the transmission of said messages over the communication network, wherein said second part comprises two sub-parts, a first sub-part comprising information describing a form of encoding or representation format used to represent said messages and a second sub-part comprising, for at least one predefined communication protocol, information defining describing functionalities of said predefined communication protocol, said functionalities being implemented for the transmission of said messages over the communication network using said communication protocol, wherein said first sub-part and second sub-part of said second part are disjoint blocks, each block being bounded by a predetermined opening tag and closing tag;

an identifying unit that identifies second sub-parts in the electronic document, pointing to the same first sub-part of the second part of said document;

an extracting unit that extracts, from the electronic document, each second sub-part identified by the identifying unit; and a displaying unit that displays the information defining the communication protocol included in each identified second sub-part, wherein said predetermined opening tag and closing tag of the first sub-part comprise a messageBinding tag, and the predetermined opening tag and closing tag of the second sub-part comprise a protocolBinding tag, and wherein, in a case where a plurality of communication protocols are implemented to offer said service to various clients over the communication network, the description of said form of encoding or representation format is not duplicated in the electronic document and said service is accessible via said plurality of communication protocols by said various clients.

16. A device according to claim 13, wherein the device comprises a computer.

17. A device according to claim 15, wherein the device comprises a computer.

18. A communication network, comprising the device according to claim 13.

19. A computer readable storage medium on which is stored a computer-executable program to implement the method of transforming an electronic document according to claim 10.

20. A computer readable storage medium on which is stored a computer-executable program to implement the comparing method according to claim 12.

21. A method according to claim 1, wherein said functionalities are used to define a pattern for message exchange.

22. A method according to claim 10, wherein said third writing step comprises:
 a selecting step of selecting an operation from the electronic document represented in the markup language; and
 a writing step of writing at least one functionality associated with the communication protocol based on the operation selected in the selecting step into the second sub-part of the transformed electronic document.

* * * * *